United States Patent
Hirschfeld

(10) Patent No.: US 8,722,777 B2
(45) Date of Patent: May 13, 2014

(54) HIGHLY LOADED CONCENTRATE PELLETS AND PREPARATION OF THE SAME

(75) Inventor: Glen Alan Hirschfeld, Sylvania, OH (US)

(73) Assignee: Thermocolor LLC, Whitmore Lake, MI (US)

( * ) Notice: Subject to any disclaimer, the term of this patent is extended or adjusted under 35 U.S.C. 154(b) by 213 days.

(21) Appl. No.: 13/269,068

(22) Filed: Oct. 7, 2011

(65) Prior Publication Data

US 2012/0088866 A1  Apr. 12, 2012

Related U.S. Application Data

(60) Provisional application No. 61/391,378, filed on Oct. 8, 2010.

(51) Int. Cl.
| | |
|---|---|
| *C08K 5/34* | (2006.01) |
| *C08K 3/18* | (2006.01) |
| *C08K 3/04* | (2006.01) |
| *C09D 4/00* | (2006.01) |
| *C08K 5/00* | (2006.01) |

(52) U.S. Cl.
USPC ............. 524/88; 524/1; 524/430; 524/495; 106/499; 106/502; 106/413; 106/447; 106/460; 252/301.36

(58) Field of Classification Search
USPC .......... 524/1, 88, 10, 430, 495; 106/499, 502, 106/413, 447, 460; 252/301.36
See application file for complete search history.

(56) References Cited

U.S. PATENT DOCUMENTS

| | | | |
|---|---|---|---|
| 5,176,751 A | * | 1/1993 | Findley ..................... 106/502 |
| 7,442,742 B1 | | 10/2008 | Smink et al. |
| 2004/0214927 A1 | * | 10/2004 | Nitzsche ..................... 524/88 |

FOREIGN PATENT DOCUMENTS

EP  0370424 A2 *  5/1990  ............. C08J 3/22

* cited by examiner

*Primary Examiner* — Michael Bernshteyn
(74) *Attorney, Agent, or Firm* — Blue Filament Law PLLC; Avery N. Goldstein

(57) ABSTRACT

A highly loaded concentrate pellet composition includes an active ingredient in a concentration of at least about 60% by weight, and a low molecular weight binder in a concentration of up to about 35% by weight. The active ingredient is substantially evenly dispersed in the binder. The binder has a melting point that permits the composition to melt under shear in an extruder. The binder is non-metallocene and non-stearic.

9 Claims, No Drawings

HIGHLY LOADED CONCENTRATE PELLETS AND PREPARATION OF THE SAME

CROSS-REFERENCE TO RELATED APPLICATIONS

This application claims the benefit of U.S. Provisional Application No. 61/391,378, filed on Oct. 8, 2010. The entire disclosure of the above application is hereby incorporated herein by reference.

FIELD OF THE INVENTION

The present disclosure relates to highly loaded concentrate pellet compositions having at least two active ingredients, and a process for preparing highly loaded concentrate pellets from the highly loaded concentrate pellet compositions.

BACKGROUND OF THE INVENTION

A common method of coloring plastics is to use color concentrate pellets. A color concentrate pellet is solid and is typically comprised of pigment and carrier. The pigment colors the plastic. The carrier acts as a binder and generally also acts to "wet" the pigment so that the pigment will mix well with the resin or plastic to be colored and so that the pigment will be well dispersed throughout the final molded, extruded, cast, or otherwise formed plastic product.

In conventional color concentrate pellets, the pigment is mixed with a carrier which is a thermoplastic resin material such as polypropylene, polyethylene, ABS, or polystyrene. The materials and the pellets produced thereby have a melting point in the range of 300° F. to 550° F. To make conventional color concentrate pellets, the pigment and carrier are mixed and heated to about 400° to 600° F. The mixture melts and is mixed, and is extruded through an extruder and then solidifies and is cut into conventional pellet size.

These conventional color concentrate pellets contain organic and inorganic pigments, and are typically 30% to 50% pigment by weight with the balance being thermoplastic resin.

These conventional pellets are then mixed with natural resin pellets of the same general size and shape to effect colorization. Natural resin pellets are pellets which have not yet been colored. Commercially sized natural resin pellets include those that are cylindrically shaped and/or round shaped, are about ⅛ inch in diameter, and are about ⅛ to ¼ inch long or approximately ⅛" round. Other commercially sized natural resin pellets, individually, have similar bulk or volume, but may have other regular geometric shapes or may have somewhat irregular shapes.

One problem with conventional color concentrate pellets is that the carrier generally must be compatible with the natural resin to be colored. To be compatible, the two must be the same or very similar. For example, a polypropylene carrier would be compatible with a polypropylene natural resin, but would not be compatible with PVC natural resin. Mixing a carrier with an incompatible natural resin could adversely affect the physical properties of the final molded product. The typical end product would comprise 96% natural resin, 2% carrier, and 2% pigment.

Another problem is that the high temperatures utilized in the extrusion process (400° F.-600° F.) tend to burn out or degrade organic pigments and certain inexpensive inorganic pigments which burn out or degrade between 400° F. and 550° F.

The conventional process is particularly disadvantageous with regard to organic pigments. Organic pigments tend to be more heat-sensitive, more unstable, and generally more expensive than inorganic pigments. The high temperatures of the conventional process are bad for organic pigments. The high temperatures also tend to use up a significant portion of the available heat history or heat tolerance of the pigments and carriers utilized. These high temperatures are thus disadvantageous.

Another known highly loaded concentrate pellet and a related process are disclosed in U.S. Pat. No. 7,442,742 to Smink et al., the entire disclosure of which is hereby incorporated herein by reference. Smink et al. describes a highly loaded concentrate pellet composition comprising a colorant, a thermoplastic carrier, and a metallocene polymer processing aid. The metallocene polymer processing aid is a substantially amorphous metallocene polypropylene polymer or copolymer. In particular, the concentration of colorant in Smink et al. is about 15-75% by weight, the thermoplastic carrier is about 9-60% by weight, and the metallocene polymer is about 2-20% by weight.

There is a continuing need for a highly loaded concentrate pellet having a carrier that is compatible with a wide range of natural resins, which can comprise up to 93% active ingredient, with a carrier which will melt at less than about 290° F., for better mixing, and will be manufactured at temperatures of less than 300° F., so as not to burn out or degrade certain heat-sensitive pigments, particularly organic pigments, which have heat sensitivity in the range of 400° F. to 550° F. Desirably, the highly loaded concentrate pellet, will not settle out upon mixing with commercially sized natural resin pellets, will look comparable to a conventional color concentrate pellet, can be made with less energy cost, and can be processed to pellet form at less than 290° F. and not unduly heat or otherwise adversely affect the qualities of organic pigments.

SUMMARY OF THE INVENTION

In concordance with the instant disclosure, a highly loaded concentrate pellet having a binder that is compatible with a wide range of natural resins, which can include up to 93% active ingredient, with a binder which will melt at less than about 290° F., for better mixing, and will be manufactured at temperatures of less than 300° F., so as not to burn out or degrade certain heat-sensitive pigments, particularly organic pigments, which have heat sensitivity in the range of 400° F. to 550° F., will not settle out upon mixing with commercially sized natural resin pellets, will look comparable to a conventional color concentrate pellet, can be made with less energy cost, and can be processed to pellet form at less than 300° F. and not unduly heat or otherwise adversely affect the qualities of organic pigments, is surprisingly discovered.

In one embodiment, a highly loaded concentrate pellet composition includes an active ingredient in a concentration of at least about 60% by weight, and a low molecular weight binder in a concentration of up to about 35% by weight. The active ingredient is substantially evenly dispersed in the binder. The binder has a melting point that permits the composition to melt under shear in an extruder. The binder is non-metallocene and non-stearic.

In another embodiment, a highly loaded concentrate pellet includes an active ingredient substantially evenly dispersed in a low molecular weight binder. The active ingredient in a concentration of at least about 60% by weight, and the low molecular weight binder in a concentration of up to about 35% by weight. The binder has a melting point that permits the binder to melt under shear in an extruder. The binder is non-metallocene and non-stearic. The pellet has at least partially a geometric shape formed by a die of the extruder. The pellet is formed by extrusion through the die of the extruder under mechanical pressure.

In a further embodiment, a method for preparing a highly loaded concentrate pellet includes the steps of: providing an extruder with a die configured to form a pellet having at least partially a geometric shape by extrusion under mechanical pressure; providing an active ingredient; providing a low molecular weight binder, the binder having a melting point that permits the binder to melt under shear in the extruder, wherein the binder is non-metallocene and non-stearic; introducing the active ingredient and the low molecular weight binder to the extruder, the active ingredient substantially evenly dispersed in the low molecular weight binder to form a highly loaded concentrate pellet composition, the active ingredient in a concentration of at least about 60% by weight, and the low molecular weight binder in a concentration of up to about 35% by weight; and extruding the composition through the die of the extruder pellet to form a pellet having at least partially a geometric shape, wherein the pellet is cohesive and friable as a result of the mechanical pressure of the extruder.

DETAILED DESCRIPTION OF THE INVENTION

The following detailed description describes and illustrates various embodiments of the invention. The description serves to enable one skilled in the art to make and use the invention, and are not intended to limit the scope of the invention in any manner. In respect of the methods disclosed, the steps presented are exemplary in nature, and thus, are not necessary or critical.

The pellet according to the present disclosure is substantially round. For example, the dimensions of the pellet are approximately 1/16 to 3/32 inch round/spherical in size.

The pellet is comprised of active ingredient and binder. As used in the specification and claims, the term "active ingredient" can include mixtures of different active ingredients. One of ordinary skill in the art should appreciate that the composition for a highly loaded concentrate pellet of the present disclosure may vary widely on the basis of weight, since the different active ingredients and different binders have different densities. The composition may also vary widely depending upon the desired end use or customer requirements for the active ingredient in the highly loaded concentrate pellet. It should further be appreciated that disclosed percentages are exemplary, and on a by-weight basis throughout the specification, unless otherwise indicated.

In a particular embodiment, the highly loaded concentrate pellets of the present invention typically are about 60% to about 93% active ingredient by weight, and the balance is binder. In an illustrative formula according to the invention, the highly loaded concentrate pellets may be about 85% active ingredient by weight, and about 15% binder by weight. Other concentrations of the active ingredient and the binder may also be employed, as desired.

Organic active ingredients typically utilized include quinacridones and phthalocyanines and also azo-type active ingredients. Typical inorganic active ingredients include nickel titanate, titanium dioxide, carbon black, cobalt, and manganese chrome antimony titanate.

Optionally, the highly loaded concentrate pellet composition of the present disclosure may also comprise additive such as ultraviolet light absorbers, light stabilizers, antioxidants, flame-retardants, antibacterial agents, surface tension reducers, deodorizing agents, anti-static agents, anti-blocking agents, plasticizer agents, blowing agents, fillers, and other known additives, or mixtures thereof. Where the binder and the active ingredient do not account for 100% of the total weight of the highly loaded concentrate pellet composition, it should be understood that the remainder may be one of the abovementioned additives.

Ultraviolet light absorbers (UVA) shield the polymer from UV light by absorbing light energy and releasing the absorbed light energy harmlessly as heat energy. Hindered amine light stabilizers (HALS) scavenge radical intermediates formed in the photo-oxidation process. The higher the concentration of UVA and/or HALS, the greater the protection of the polymer (both the highly loaded concentrate pellet binder and the end product) from degradation and the color from fading. UVAs and HALS can be added up to about 50% by weight of the highly loaded concentrate pellet. Illustrative examples of UVA's and HALS include salicylic acid derivatives such as phenyl salicylate, p-t-butyl salicylate, etc., benzophenone system such as 2,4-dihydroxy benzophenone, 2-hydroxy-4-methoxybenzophenone, etc., benzotriazole system such as 2-(2'-hydroxy-3',5'-di-t-butylphenyl)benzotriazole, 2-(2'-hydroxy-3'-t-butyl-5'-methylphenyl)-5-chlorobenzotriazole, etc., hindered amine system such as bis(2,2,6,6-tetramethyl-4-piperidyl) sebacate, dimethyl succinate-1-(2-hydroxyethyl)-4-hydroxy-2,2,6,6-tetramethyl piperidine condensation product, 2-hydroxybenzophenones, e.g. 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g. 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol; benzoates, e.g. phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β-diphenylacrylate and methyl-2-cyano-3-methyl-3-(p-methoxyphenyl)acrylate, and any other known UVA, or mixtures thereof.

Additional illustrative examples of HALS include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidylsebacate, bis(1,2,2,6,6-pentamethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(1,2,2,6,6-pentamethyl-4-piperidyl)-di(tridecyl)-1,2,3,4-butane tetracarboxylate, bis(1,2,2,6,6-pentamethyl-4-piperidyl)-2-butyl-2-(3',5'-di-t-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino) hexane/dibromoethane polycondensate, 1,6-bis(2,2,6,6-tetramethyl-4-piperidylamino)hexane/2,4-dichloro-6-t-octy-l amino-s-triazine polycondensate, 1,6-bis(2,2,6,6-tetramethyl-4-piperidylannino)hexane/2,4-dichloro-6-morpholino-s-triazine polycondensate, and the like, or mixtures thereof.

Antioxidants, including processing stabilizers, can be added to the highly loaded concentrate pellet composition up to about 25% by weight of the highly loaded concentrate pellet. Peroxide polymer degradation generally occurs during processing (due to heat or shear), or at the time of light exposure. Peroxide radicals may be formed during this period, which in turn may lead to the formation of hyperoxides. Antioxidants are incorporated into polymers to stabilize peroxide radicals to prevent degradation. Optimal polymer stability is achieved when the initial molecular weight and/or the initial color of the polymer is maintained. Therefore, the present highly loaded concentrate pellet composition provides a higher degree of protection by achieving higher additive concentrations without sacrificing colorant concentration. In one embodiment, both UVAs (and/or HALS) and an antioxidant may be added up to about 50% by weight of the highly loaded concentrate pellet. It is preferred in such embodiments that the UVAs (and/or HALS) are added up to about 25% by weight of the highly loaded concentrate pellet, and the antioxidant is added up to about 25% by weight of the highly loaded concentrate pellet. Sterically hindered phenols or HALS are preferred antioxidants. Other illustrative examples of antioxidants include a phenol system such as 2,6-di-t-butyl-p-Cresol, pentaerythritol-tetrakis-(3,5-di-t-butyl-4-hydroxyphenyl) propionate methyl phenol, octadecyl-3-(3,5-di-t-butyl-4-hydroxyphenyl) propionate, etc., phosphorus system such as tris(2,4-di-t-butylphenyl)phosphate, distearylpnetaerythritol diphophate, tetrakis(2,4-di-t-butylphenyl)-4,4'-biphenylene phosphonate, etc., sulfur system such as distearyl-3,3'-thiodipropionate, pentaerythritol-tetrakis-(3-laurylthiopropionate), hindered phenol type antioxidants and peroxide decomposers, HALS (as set described above), or mixtures thereof.

Illustrative examples of hindered phenol type antioxidants are 2,6-di-t-butyl-4-methylphenol, styrenated phenol, n-octadecyl-3-(3,5-di-t-butyl-4-hydroxylphenyl) propionate, 2,2'-methylene bis(4-methyl-6-t-butylphenol), 2-t-butyl-6-(3-t-butyl-2-hydroxy-5-methylbenzyl)-4-methylphenylacrylate, 2-[1-(2-hydroxy-3,5-di-t-pentylphenyl)ethyl]-4,6-di-t-pentylphenyl acrylate, 4,4'-butylidene bis(3-methyl-6-t-butylphenol), 4,4'-thio-bis(3-methyl-6-t-butylphenol), alkylated bisphenol, tetrakis[methylene-3-(3,5-di-t-butyl-4-hydroxyphenyl)-proprionate] methane, 3,9-bis[2-{3-(3-t-butyl-4-hydroxy-5-methylphenyl)-propionyloxy}-1,1-dimethylethyl]-2,4,8,10-tetraoxyspiro [5.5]undecane, or mixtures thereof.

Illustrative examples of peroxide decomposers are organic phosphorus type peroxide decomposers, such as tris-nonylphenylphosphite, triphenylphosphite and tris(2,4-di-t-butylphenyl)phosphite; and organic thio type peroxide decomposers, such as dilauryl-3,3'-thiodipropionate, dimyristyl-3,3'-thiodipropionate, distearyl-3,3'-thiodipropionate, pentaerythrityltetrakis(3-laurylthiopropionate), ditridecyl-3,3'-thiodipropionate and 2-mercaptobenzimidazole, or mixtures thereof.

Illustrative examples of flame-retardants are phosphoric acid systems such as allyl diallyl phosphate, cresyl diphenyl phosphate, octyl diphenyl phosphate, triallyl phosphate, tributyl phosphate, triphenyl phosphate, tris(β-chloroethyl) phosphate, tris(dichloropropyl)phosphate, tris(2,3-dibromopropyl)phosphate, tris(bromo-chloropropyl)phosphate, etc., chlorine system such as chlorinated paraffin, chlorinated polyphenyl, perchloropentacyclodecane, etc., bromine system such as tetrabromoethane, tetrabromobutane, hexaborombenzene, decabromodiphenyloxide, polydibrornophenyloxide, bis(tribromophenoxy)ethane, ethylene bis-bromonorbornane dicarboxylmide, ethylene bistetrabromophthalimide, etc. reaction type such as chlorendic acid anhydride, tetrabromo phthalic anhydride, tetrabromo bisphenol A, dietoxy-bis-(2-hydroxyethyl)-aminonnethyl phosphate, dibormcresyl alycidyl ether, etc, or mixtures thereof.

Illustrative examples of antibacterial agents include, phenol ether based antibacterial agents, such as those having the phenol group in the intramolecular skeleton, for example, 10,10'-oxybisphenoxa arsine, etc.; natural antibacterial agents, such as those having tropolone as a central skeleton, for example, hinokitiol, β-dolabulin, etc., as glycerol ester of fatty acid, lower fatty acid monoglycerol ester, sucrose fatty acid ester, polyglycerol fatty acid ester, for example, monoglyceride caprylate, monoglyceride caprate, lauric acid monoglyceride, Sugar-ester palpitate, decaglycerol monocaprate, hexaglycerol caprylate, etc., zeolite-based compounds, part or whole of ion-exchangeable ion in zeolite-based compounds, for example, part or whole of sodium ion, calcium ion, potassium ion, magnesium ion, iron ion, etc. is substituted with ions with antibacterial property, such as silver ion, copper ion, zinc ion, ammonium ion, etc. can be exemplified. These compounds can be used singly or two or more kinds of them can be used in combination.

Fillers are typically inexpensive particulate materials that do not contribute to the color. Illustrative examples of fillers include, among others, talcs, calcium carbonates, micas, clays, nano-clays, silicas, or mixtures thereof. Alternative fillers may also be used, as desired.

One of ordinary skill in the art may employ alternative active ingredients, not listed herein, in the highly loaded concentrate pellet composition as desired.

The present invention disperses organic active ingredients substantially evening in the binder. Due to the oil absorption rate of organic active ingredients, one cannot achieve as high a loading level with organic active ingredients as one can with inorganic active ingredients in color concentrate pellets of the present invention. As a nonlimiting example, one can achieve up to about 70% to 72% loading levels of organic active ingredients and up to about 93% loading levels of inorganic active ingredients in the pellets of the present invention.

In the present invention, it is normal to use combinations of organic and inorganic active ingredients. Typically, high levels of inorganic active ingredients are used in combination with lower levels of organic active ingredients. If the loading level is 93% by weight, the active ingredient may be 100% inorganic. Alternatively, if a loading level of 80% active ingredient by weight is desired, up to about 50% organic active ingredient can be put in, with the balance being inorganic active ingredient. If a 65% loading level is desired, this could, for example, be achieved with 10% organic/55% inorganic, or 30% organic/35% inorganic, or 50% organic/15% inorganic, as nonlimiting examples.

In a particular embodiment, the highly loaded concentrate pellet formulation is approximately 60% by weight active ingredient, approximately 15% by weight binder, and approximately 25% by weight filler.

The binder is utilized to bind the active ingredient and also generally operates to wet the active ingredient so that it is more dispersable in end use. The binder is distinguishable from typical thermoplastic resin carriers, such as homopolymers and copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, and polyamides, which each have a significantly greater molecular weight and melting point than the binder of the present disclosure.

In a particular embodiment, the low molecular weight binder is one of a low molecular weight polymer and a wax. The wax may be a synthetic or petroleum derived wax. The wax may be a polyethylene wax, as one example. The low molecular weight binder may be ethylene vinyl acetate polymer, as another example.

Other suitable low molecular weight binders may broadly include low density ethylene homopolymer waxes, micronized polyethylene waxes, micronized partly saponified esters of montanic acids, polypropylene waxes, high density polyethylene waxes, blends of aliphatic carboxylic acid salts and mono- and di-amides, and blends of complex modified fatty acid esters. One of ordinary skill in the art should understand that other low molecular weight binders are also within the scope of the present disclosure.

It should be further understood that the binder of the present disclosure is non-stearic. For example, the binder is not a bis stearamide wax. It should also be understood that the binder of the present disclosure is also non-metallocene. For example, the binder is not a metallocene processing aid as described U.S. Pat. No. 7,442,742 to Smink et al. Likewise, dispersants such as zinc stearates are not necessary for the formation of pellets according to the present disclosure.

It has heretofore been unappreciated in the art that dispersants, such as metallocene polymers used in conjunction with conventional thermoplastic resin carriers (not low molecular weight binders) to improve dispersability of conventional highly loaded concentrate pellets, can be instead replaced with low molecular weight binders, such as disclosed herein.

A binder is not necessarily a single compound; combinations of ingredients can be utilized as a binder, which may also be referred to as a "binder system." As utilized in the illustrated embodiments, the components of the binder may have different melting points, but when mixed, the mixture or binder will melt at about 120° F. to about 550° F. In a particular example, the binder or the binder system has a melting point less than about 300° F. Where the binder consists entirely of synthetic or petroleum derived wax, the binder may have a melting point less than about 250° F. The color concentrate pellet, containing active ingredient and binder, will melt at about the same temperature as that of the binder of which it is formed. It is desirable that the binder utilized be compatible with a wide range of types of natural resin. When this is achieved, a single type pellet can be utilized to color a variety of different types of natural resins. In the conventional art, as described above, a plurality of different types of pellets of the same color are, or may be, needed to color the same plurality of types of natural resin.

To make pellets in accordance with the present disclosure, it is preferable to preblend the active ingredient and the binder in a high intensity, bowl-type mixer.

Although typical thermoplastic resins are not employed as the binder of the present disclosure, in contrast to their conventional use as the carrier in highly loaded concentrate pellet compositions, thermoplastic resins can optionally be used in conjunction with the low molecular weight binder to adjust melting point and processability.

The active ingredient and the binder of the present disclosure are introduced to an extruder and are "hot-formed".

In particular embodiments, the extruder has a die with a cavity configured to form pellets each having at least partially a geometric shape by extrusion of the preblend under mechanical pressure. The preblend may be fed continuously in a controlled, even stream from a supply hopper (not shown) to the extruder feed hopper. Rotation of the at least one screwed in a barrel of the extruder causes the preblend to be carried from the hopper by the rotation, and to a die adjacent an end of the extruder barrel. The die has cavities configured to provide desired geometric shapes to the extruded pellets. The highly loaded concentrate pellet compositions are formed through the die cavities by mechanical pressure of the rotating screw inside the extruder barrel. A knife may be employed to shear the resulting pellets. Other means for shearing the pellets may also be employed.

The size of the pellets can be controlled by controlling the process parameters.

It should be understood that the preblend of the present disclosure melts under the shear and temperature typically associated with the extruder. For example, the extruder may be a twin-screw extruder operating at an average temperature between about 150° F. and about 290° F. A skilled artisan may select alternative extruder temperatures, for example, depending upon the melting point of the highly loaded concentrate pellet composition, as desired.

Advantageously, the employment of the extruder with the highly loaded concentrate pellet compositions of the present invention permits the melting of the highly loaded concentrate pellet composition, and thus, further disperses the active ingredient in the binder, in contrast to the known cold forming by CPM. Melting of the highly loaded concentrate pellet composition in the CPM equipment would result in an undesirable binding of the CPM equipment.

While certain representative embodiments and details have been shown for purposes of illustrating the invention, it will be apparent to those skilled in the art that various changes may be made without departing from the scope of the disclosure, which is further described in the following appended claims.

What is claimed is:

1. A highly loaded concentrate pellet composition comprising:
   an active ingredient selected from the group consisting of: quinacridones, phthalocyanines azo-type dyes, nickel titanate, titanium dioxide, cobalt, and manganese chrome antimony titanate, said active ingredient in a concentration of at least 60% by weight; and
   a low molecular weight binder in a concentration of up to 35% by weight, the active ingredient evenly dispersed in the binder, wherein the binder is non-metallocene and non-stearic and not one of: homopolymers and copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, or polyamides.

2. The highly loaded concentrate pellet composition of claim 1, wherein the binder is a wax with a melting point between 120° F. and 250° F.

3. The highly loaded concentrate pellet composition of claim 1, wherein the concentration of the active ingredient is between 60% and 93% by total weight and the concentration of the low molecular weight binder is between 35% and 7% by total weight, wherein the binder and the active ingredient account for the total weight of the composition.

4. A highly loaded concentrate pellet comprising:
   an active ingredient selected from the group consisting of: quinacridones, phthalocyanines azo-type dyes, nickel titanate, titanium dioxide, cobalt, and manganese chrome antimony titanate, said active ingredient in a concentration of at least 60% by weight;
   evenly dispersed in a low molecular weight binder, the active ingredient in a concentration of at least 60% by weight, and the low molecular weight binder in a concentration of up to 35% by weight, wherein the binder is non-metallocene and non-stearic and not one of: homopolymers and copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, and polyamides, wherein the pellet has at least partially a geometric shape formed by a die of the extruder, and the pellet is formed by extrusion through the die of the extruder under mechanical pressure.

5. A method for preparing a highly loaded concentrate pellet, comprising:
providing an extruder with a die configured to form a pellet having at least partially a geometric shape by extrusion under mechanical pressure;
providing an active ingredient selected from the group consisting of: quinacridones, phthalocyanines azo-type dyes, nickel titanate, titanium dioxide, cobalt, and manganese chrome antimony titanate, said active ingredient in a concentration of at least 60% by weight;
providing a low molecular weight binder, wherein the binder is non-metallocene and non-stearic and not one of: homopolymers and copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, or polyamides;
introducing the active ingredient and the low molecular weight binder to the extruder, the active ingredient evenly dispersed in the low molecular weight binder to form a highly loaded concentrate pellet composition, the active ingredient in a concentration of at least 60% by weight, and the low molecular weight binder in a concentration of up to 35% by weight; and
extruding the composition through the die of the extruder pellet to form a pellet having at least partially a geometric shape, wherein the pellet is cohesive and friable as a result of the mechanical pressure of the extruder.

6. The method of claim 5, further including the step of preblending the active ingredient and the low molecular weight binder prior to the step of extruding the pellets to evenly disperse the active ingredient in the low molecular weight binder.

7. The highly loaded concentrate pellet composition of claim 1 further comprising at least one additive selected form group consisting of: an ultraviolet light absorber, a light stabilizer, an antioxidant , a flame-retardant, an antibacterial agent, a surface tension reducers, a deodorizing agent, an anti-static agent, an anti-blocking agent, a plasticizer agents, a blowing agent, a fillers, or mixtures thereof.

8. The highly loaded concentrate pellet composition of claim 7 wherein the additive is the ultraviolet light absorber.

9. The highly loaded concentrate pellet composition of claim 7 wherein the additive is the antioxidant.

* * * * *